US007386057B2

United States Patent
Ito et al.

(10) Patent No.: US 7,386,057 B2
(45) Date of Patent: Jun. 10, 2008

(54) ITERATIVE SOFT INTERFERENCE CANCELLATION AND FILTERING FOR SPECTRALLY EFFICIENT HIGH-SPEED TRANSMISSION IN MIMO SYSTEMS

(75) Inventors: Takumi Ito, Kawasaki Kanagawa (JP); Xiaodong Wang, New York, NY (US)

(73) Assignee: NEC Corporation, Tokyo (JP)

( * ) Notice: Subject to any disclaimer, the term of this patent is extended or adjusted under 35 U.S.C. 154(b) by 880 days.

(21) Appl. No.: 10/371,667

(22) Filed: Feb. 20, 2003

(65) Prior Publication Data

US 2004/0165675 A1  Aug. 26, 2004

(51) Int. Cl.
  *H04B 7/02* (2006.01)
  *H04L 1/02* (2006.01)
(52) U.S. Cl. .................. 375/267; 375/260; 375/284; 375/346; 375/347
(58) Field of Classification Search ............... 375/267, 375/349, 260, 284, 346, 347
  See application file for complete search history.

(56) References Cited

U.S. PATENT DOCUMENTS

| 2002/0110206 | A1* | 8/2002 | Becker et al. .............. 375/346 |
| 2002/0161560 | A1* | 10/2002 | Abe et al. .................... 702/196 |
| 2003/0103584 | A1* | 6/2003 | Bjerke et al. ............... 375/340 |
| 2003/0154435 | A1* | 8/2003 | Claussen et al. ............ 714/755 |
| 2004/0083082 | A1* | 4/2004 | Onggosanusi et al. ......... 703/2 |

| 2004/0105489 | A1 | 6/2004 | Kim et al. |

FOREIGN PATENT DOCUMENTS

| CN | 1373561 A | 10/2002 |
| KR | 10-2004-0035505 | 4/2004 |
| WO | WO 02/17508 A2 | 2/2002 |

OTHER PUBLICATIONS

X. Wang, et al., "Iterative (Turbo) Soft Interference Cancellation and Decoding for Coded CDMA", *IEEE Transactions on Communications*, vol. COM-47, No. 7, pp. 1046-1061, (1999).

(Continued)

*Primary Examiner*—Ted Wang
(74) *Attorney, Agent, or Firm*—Scully, Scott, Murphy & Presser, P.C.

(57) ABSTRACT

Canceling interference in a multi-input multi-output (MIMO) system is accomplished with a plurality of interference cancellers. Each interference canceller outputs an interference-cancelled received version of its corresponding transmitted signal. An estimate of the transmitted signals from all transmitting antennae is used in each interference canceller. Each estimate is multiplied by a channel coefficient matrix, which can be derived from the communication of known pilot symbols, and the resulting products of each estimate and the channel coefficient matrix are subtracted from the received signals, resulting in a corresponding difference. Each corresponding difference may be multiplied by a filter weight vector. The received signal is decoded based upon the resulting products If a predetermined interrupt criteria is not met, then the decoded signal is used in the preparation of the estimate for a subsequent interference cancellation iteration. The method can be iteratively performed until the predetermined interrupt criteria is met.

23 Claims, 5 Drawing Sheets

OTHER PUBLICATIONS

G.J. Foschini, et al., "Simplified Processing for High Spectral Efficiency Wireless Communications Employing Multi-Element Arrays", *IEEE Journal on Selected Areas in Communications*, vol. 17, No. 11, pp. 1841-1852, (1999).

P.W. Wolniansky, et al., "V-Blast: An Architecture for Realizing Very High Data Rates Over the Rich-Scattering Wireless Channel", *Proc. on IEEE Int. Symp. On Signals, Systems and Electronics*, pp. 295-300, (1998).

G.J. Foschini, et al., "On Limits of Wireless Communications in a Fading Environment when Using Multiple Antennas", *Wireless Personal Communications*, vol. 6, pp. 311-335, (1998).

T.L. Marzetta, "BLAST Training: Estimating Channel Characteristics for High Capacity Space-Time Wireless", *Proc. 37th Annual Allerton Conference and Communications, Computing and Control*, (1999).

B.M. Hochwald, et al., "Achieving Near-Capacity on a Multiple-Antenna Channel" *IEEE Transactions and Communications*, pp. 1-28, (2001).

H. Atarashi, et al., "Broadband Packet Wireless Access Based on VSF-OFCDM and MC/DS-CDMA", *Proc. of IEEE Int. Conf. On PIMRC*, (2002).

E. Telatar, "Capacity of Multi-Antenna Gaussian Channels" *European Transactions on Telecommunications*, vol. 10, No. 6, pp. 585-595, (1999).

G.D. Golden, et al., "Detection Algorithm and Initial Laboratory Results Using V-Blast Space-Time Communication Architecture", *IEEE Electronics Letters*, vol. 35, No. 1, pp. 14-16, (1999).

M. Stege, "MIMO-Capacities for COST 259 Scenarios" *International Zurich Seminar on Broadband Communications*, pp. 29-1-29-6, (2002).

Won-Joon Choi, et al., "Iteravtive Soft Interference Cancellation for Multiple Antenna Systems", *IEEE*, vol. 1, pp. 304-309, (2000).

\* cited by examiner

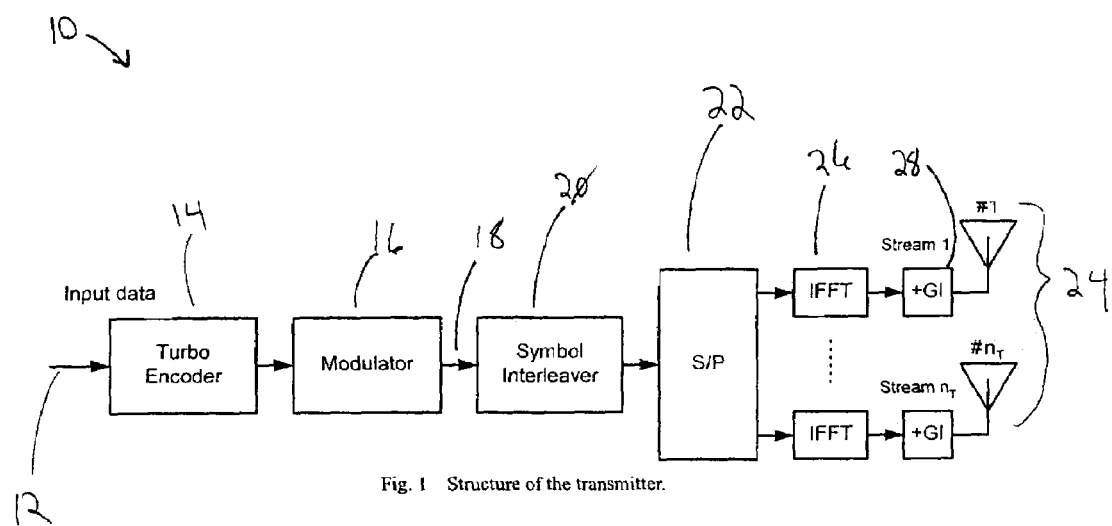
Fig. 1 Structure of the transmitter.

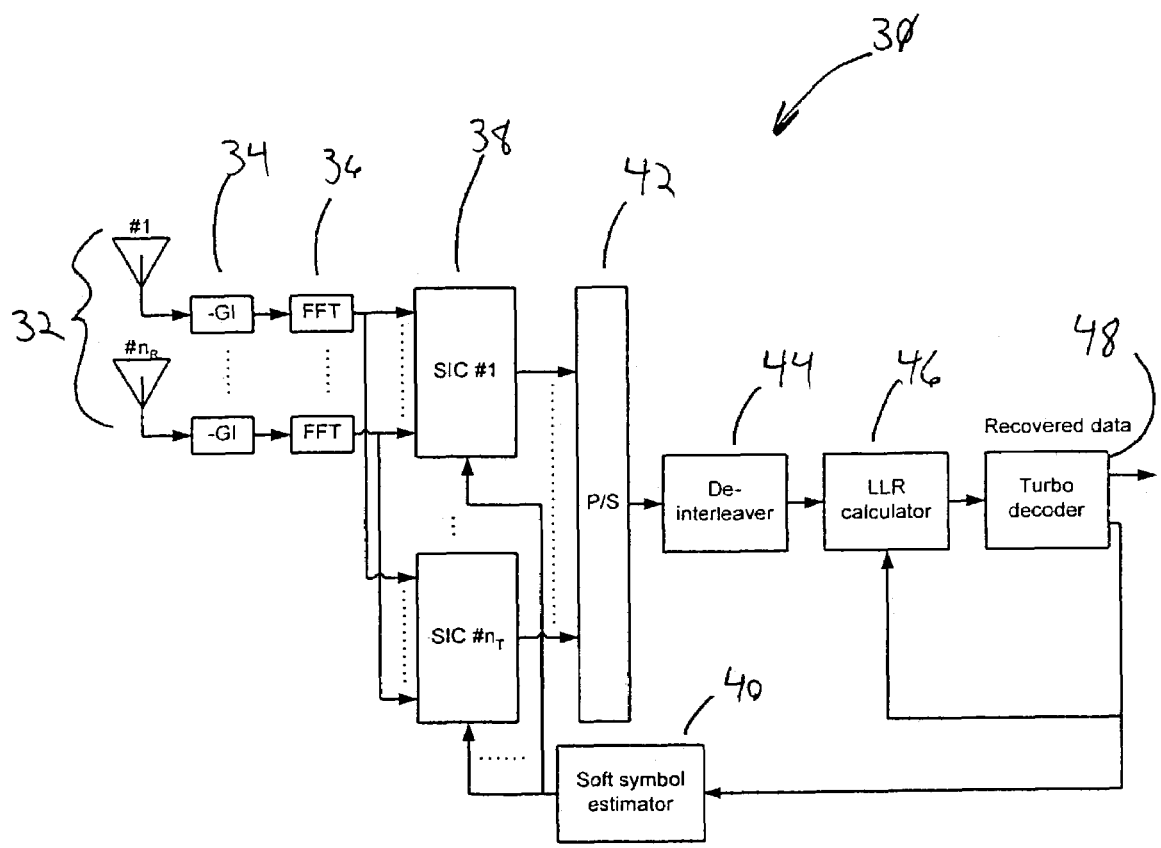
Fig. 2 Overview of the iterative receiver

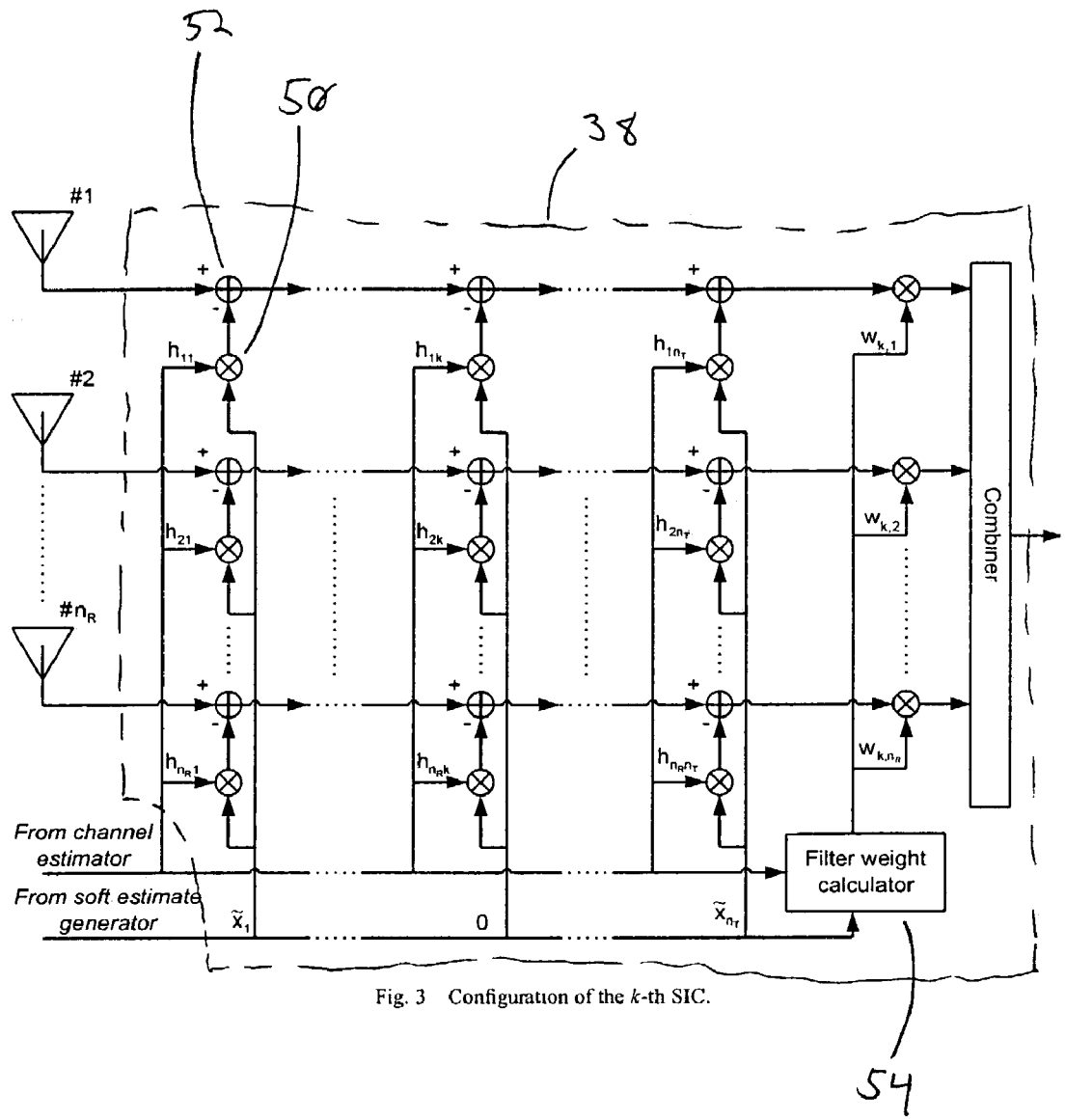
Fig. 3 Configuration of the $k$-th SIC.

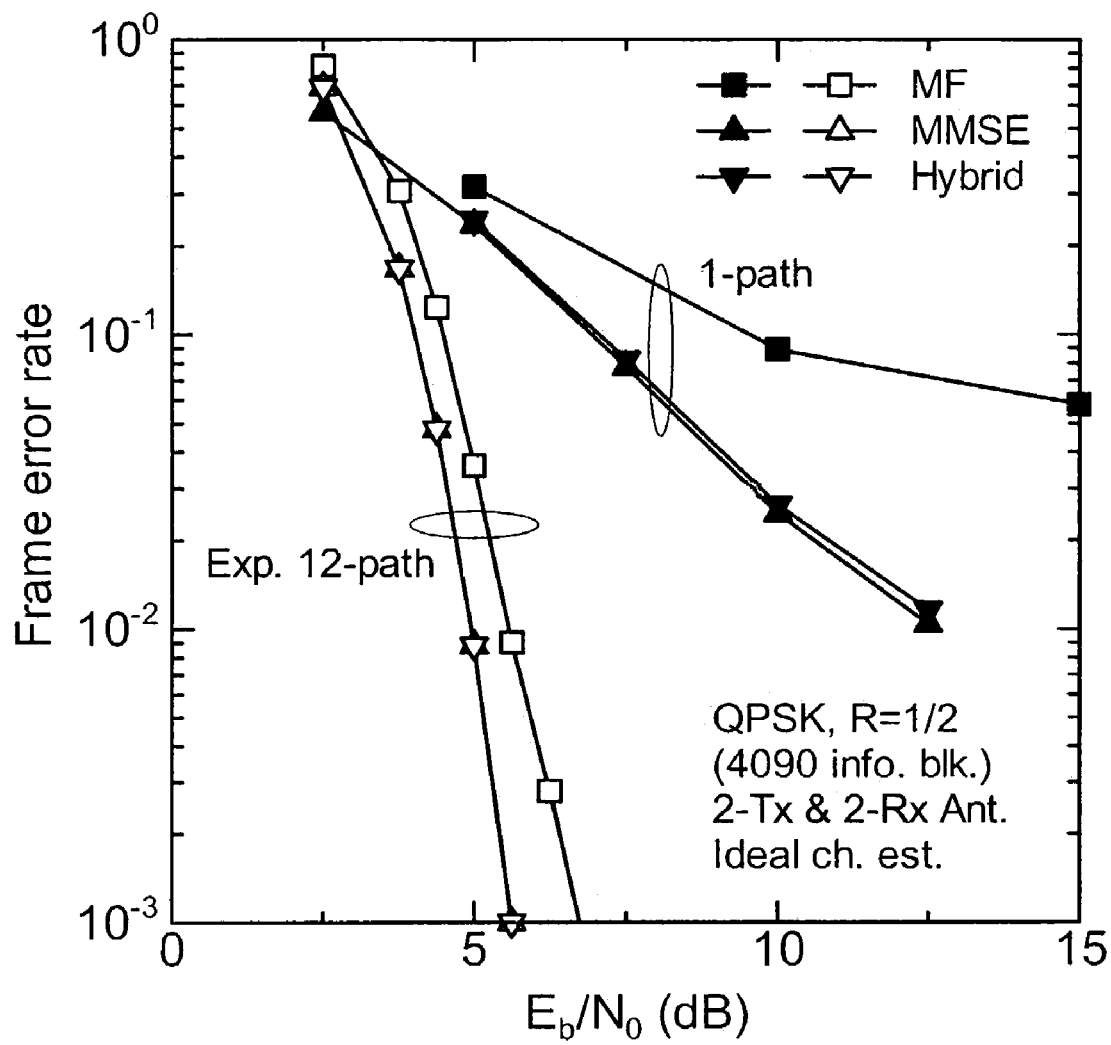
Fig. 4 FER performance under (2x2).

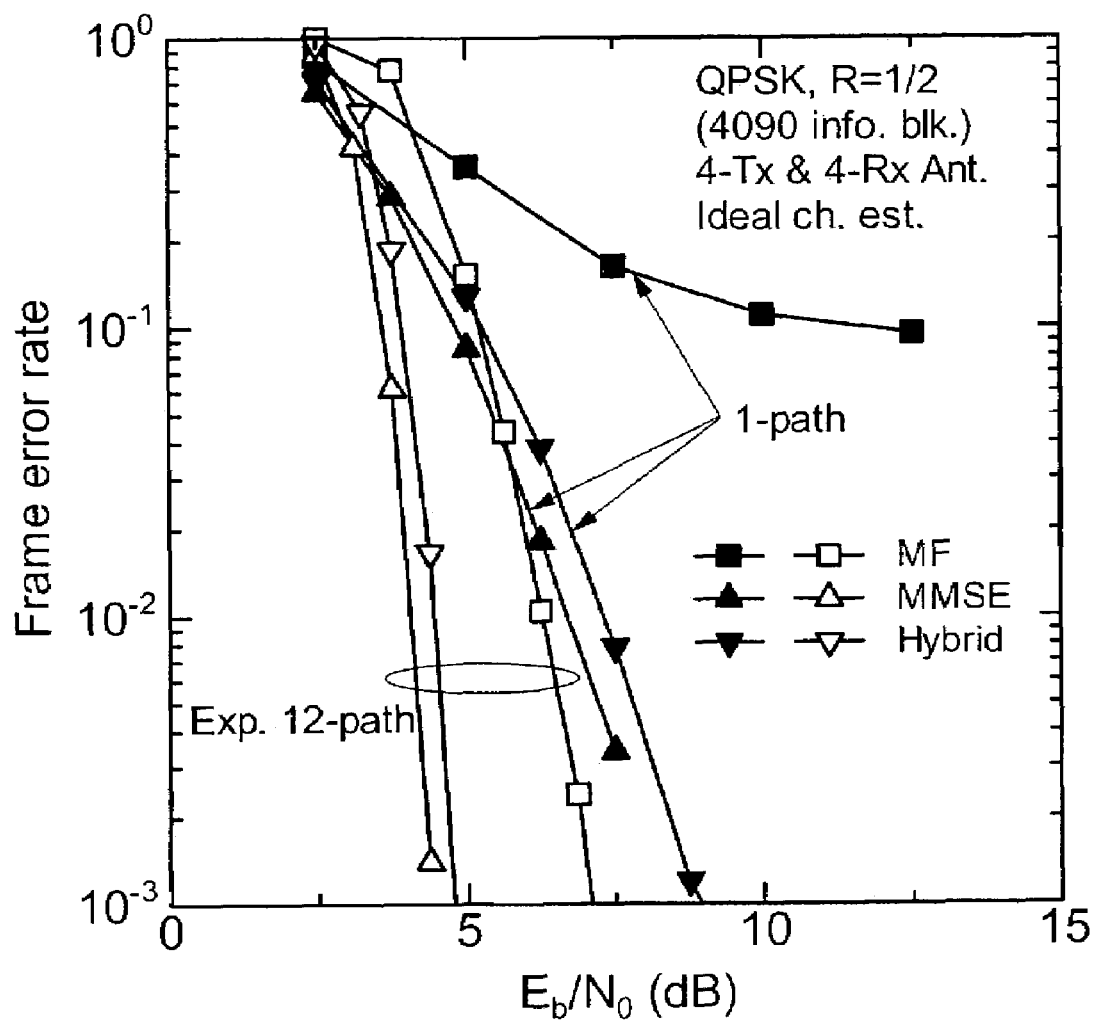
Fig. 5 FER performance under (4x4).

ITERATIVE SOFT INTERFERENCE CANCELLATION AND FILTERING FOR SPECTRALLY EFFICIENT HIGH-SPEED TRANSMISSION IN MIMO SYSTEMS

BACKGROUND OF THE INVENTION

1. Field of Invention

The invention relates to the field of telecommunications and more specifically to an iterative soft interference canceller (I-SIC) for use on the receiving side of a multi-input multi-output (MIMO) telecommunications system.

2. Description of Related Art

Widespread use of the Internet motivates the design of more reliable, comfortable and efficient communication systems, especially in the mobile environment due to its portability and convenience. So-called the third generation (3G) systems are being introduced to support several hundred kbps data services in addition to high quality voice message transmissions, and its upgraded version, high-speed downlink packet access (HSDPA), is also under discussion and standardization at the third generation partnership project (3GPP) to offer higher bit rate services. However, achievable bit rate is still limited up to 10 Mbps even when HSDPA utilizes automatic repeat request (ARQ) and adaptive modulation and coding scheme (AMCS). However, user demand for data rate requires approximately 100 Mbps to enjoy streaming video, high-speed Internet connection and so forth, even in a mobile situation.

One known strategy to realize high-speed transmission in the physical layer is the expansion of bandwidth. Atarashi, et al., proposed variable spreading factor orthogonal frequency and code division multiplexing (VSF-OFCDM) which assumes 130 MHz bandwidth to achieve 100 Mbps in outdoor environments. However, this approach requires very high speed digital-to-analog and analog-to-digital converter due to its very high sampling rate. Hence, the power consumption, especially in the user equipment, would become a problem. Another problem is that such a wide bandwidth induces excessive multi-path delay, which makes such a suitable receiver difficult to design and operate.

An alternative approach to increasing the spectral efficiency is to adopt higher-order modulation schemes. In fact, IEEE 802.11a employs 64QAM to realize 54 Mbps with 20 MHz bandwidth for indoor wireless local area network (LAN) systems. However, when we consider application of this scheme in the mobile environment, 64QAM would be no longer efficient because it is less tolerant to interference than QPSK. Moreover, greatly increased transmission power would be required to compensate for its poor error rate performance.

On the other hand, spatial multiplexing techniques, for example, the so-called multi-input multi-output (MIMO) system, have gained much attention recently. Information theory results indicate that the capacity of a MIMO system increases linearly with the minimum of the number of transmit antennas and the receive antennas. In MIMO systems, the most serious problem would be interference from other transmit antennas. Foschini, et al., proposed the Bell Laboratories Layered Space-Time (BLAST) architecture to achieve high-speed wireless transmission and the corresponding detection algorithms that employ interference cancellation and suppression. However, this scheme would not be efficient when combined with error correction coding since processing in the detector and the decoder are separately performed. On the other hand, although the maximum a posteriori (MAP) algorithm is known as optimum when jointly operated for detector and decoder, the computational complexity becomes prohibitive.

BRIEF SUMMARY OF THE INVENTION

Therefore, to address this and other problems in the prior art, the present invention discloses low complexity iterative soft interference canceller (SIC) followed by filtering to realize spectrally efficient transmission in turbo coded MIMO systems. In this algorithm, soft information is exchanged between the demodulator and the decoder in a turbo fashion to successively cancel and suppress interference from other antennas and recover the information symbols. Filtering can be either according to a minimum mean square error (MMSE) algorithm, or matched filtering (MF) instead of MMSE filtering for complexity reduction, or some combination thereof.

In one embodiment, the invention includes providing a received signal from each of plural receiving antennae to each of a plurality of interference cancellers, at least one interference canceller corresponding to each said transmitted signal, each interference canceller canceling interference against its corresponding transmitted signal. Interference is cancelled by comparison of the received signals with an estimate of the transmitted signal, and cancellation of all but the corresponding transmitted signal in each interference canceller.

In a further embodiment, the invention includes preparing an estimate of the transmitted signals from all transmitting antennae for use in each interference canceller, multiplying each estimate by a channel coefficient matrix, which can be derived from the communication of known pilot symbols, subtracting the resulting products of each estimate and the channel coefficient matrix from the received signals, resulting in a corresponding difference between each of the products and each of the received signals. Each corresponding difference may be multiplied by a filter weight vector, selectively chosen from a MMSE of MF scheme in each iteration. The received signal is decoded based upon the resulting products of said difference and said filter weight vector. If a predetermined interrupt criteria is not met, then the decoded signal is used in the preparation of the estimate for a subsequent interference cancellation iteration. The method can be iteratively performed until the predetermined interrupt criteria is met.

The invention includes both the methods of canceling described herein, as well as apparatus to implement the methods. Among these apparatus are interference cancellers, and receivers operative to cancel interference in accordance with the present invention.

BRIEF DESCRIPTION OF THE DRAWINGS

These and other features, benefits and advantages of the present invention will become apparent through the following specification and appended claims, and the accompanying figures, where like reference numerals refer to like features across the several views, and where:

FIG. 1 shows a transmitter according to one embodiment of the present invention;

FIG. 2 shows an exemplary embodiment of the Iterative Soft Interference Canceling (I-SIC) receiver according to the present, invention;

FIG. 3 shows the configuration of a single Soft Interference Canceller (SIC) in some additional detail;

FIG. 4 shows the simulated FER performances of a 2-transmitter/2-reciever MIMO system in accordance with an embodiment of the present invention; and FIG. 5 shows the simulated FER performances of a 4-transmitter/4-reciever MIMO system in accordance with yet another embodiment of the present invention.

DETAILED DESCRIPTION OF THE INVENTION

FIG. 1 shows the configuration of the transmitter, generally 10. The input data bit stream 12 is first encoded by a turbo encoder 14, and fed to a modulator 16 to generate complex baseband symbols 18. In this embodiment, QPSK modulation with Gray mapping is employed. However, those skilled in the art will recognize that the following descriptions are easily expanded to other modulation schemes. The QPSK symbols are randomly interleaved by a symbol interleaver 20, and serial-to-parallel (S/P) converted in S/P converter 22. The interleaver 20 is necessary to randomize both the channel and the interference seen by receiver. The S/P-converted $n_T$ symbol streams are simultaneously transmitted from $n_T$ antennae 24 sharing the same frequency band. When Orthogonal Frequency Division Multiplexing (OFDM) and/or spread spectrum is employed, Inverse Fast-Fourier Transform (IFFT) 26 and/or spreading are applied to each symbol stream after S/P converter 22. Optionally, guard intervals may also be inserted by appropriate means 28, in a manner known in the art.

FIG. 2 shows an exemplary embodiment of the Iterative Soft Interference Canceling (I-SIC) receiver, generally 30, according to the present invention. Signals are received at each of $n_R$ antennae 32. Guard intervals are removed from each received stream by appropriate means 34, and a FFT 36 is performed, as necessary. Next, interfering symbols are removed by $n_T$ parallel SICs 38 using a soft estimate from soft symbol estimator 40. The estimate will be zero in a first iteration, and afterward is obtained from a previous step. Then, interference cancelled symbols are fed to log likelihood ratio (LLR) calculator 46 through parallel-to-serial (P/S) converter 42 and de-interleaver 44. In the LLR calculator 46, LLR of all code bits are computed based on the SIC 38 outputs, symbol constellations and turbo decoder 48 output. Subsequently, only extrinsic information, described further infra, computed in the LLR calculator 46 is iteratively fed to turbo decoder 48 for decoding.

Generally, in a non-iterative receiver, turbo decoder 48 outputs the LLR of the information bit and makes decisions to recover data streams. However, in the iterative receiver according to the present invention, the LLR is necessary for code bit to make soft estimates of transmitted symbols except for the last iteration. Also, extrinsic information should be fed back to LLR calculator. Thus, the turbo decoder is slightly modified to do so, and the produced LLR of code bits is then fed to the soft symbol estimator 40. In an exemplary embodiment of the invention, the turbo decoder 48 utilizes the Max-Log-MAP algorithm. Below, the operation of the SIC 38, LLR calculator 46 and soft symbol estimator 40 are described in more detail.

FIG. 3 shows the configuration of the k-th SIC 38. What follows will focus on a particular symbol instant. The received signal can be written as $$y = Hx + n \quad \text{(Eq. 1)}$$

where y, H, x, and n are the received signal vector, the channel coefficient matrix, the transmitted symbol vector and the ambient Gaussian noise vector, respectively, and are given by $$y = (y_1, y_2, \ldots y_{n_R})^T, \quad H = \begin{pmatrix} h_{11} & h_{12} & \cdots & h_{1n_T} \\ h_{21} & \ddots & & \vdots \\ \vdots & & \ddots & \vdots \\ h_{n_R 1} & \cdots & \cdots & h_{n_R n_T} \end{pmatrix},$$

$$x = (x_1, x_2, \ldots x_{n_R})^T, \text{ and } n = (n_1, n_2, \ldots n_{n_R})^T.$$

The objective of the k-th SIC 38 is cancellation of the interfering signals against the k-th transmitted symbol stream. To accomplish this, the estimated symbols from previous iterations are used as replica of the transmitted symbols and to cancel all but the k-th signal from the received signals.

In the soft estimate of the transmitted signal, the k-th symbol is replaced by zero (0) as shown in the lower part of FIG. 4. The channel matrix is multiplied with the soft symbol vector at each of multiplication junctions 50, and subtracting it from the received signals at each of several summing junctions 52, we obtain $$y_k = y - H\tilde{x}_k, \, k = 1, 2, \ldots n_T \quad \text{(Eq. 2)}$$

where, $y_k$ and $\tilde{x}_k$ denote the interference cancelled received signal vector and the soft estimate of $x_k$ for the k-th stream, respectively, and given by $y_k = (y_{k,1}, y_{k,2}, \ldots y_{k,n_R})^T$ and $\tilde{x}_k = (\tilde{x}_1, \tilde{x}_2, \ldots \tilde{x}_{k-1}, 0, \tilde{x}_{k+1}, \ldots \tilde{x}_{n_T})^T$. The calculation of $\tilde{x}_k$ is specified infra.

Before yielding an output for a given iteration in each SIC, $n_R$ parallel streams are filtered using filter weights determined by a filter weight calculator 54. In this case, since $y_k$ contains residual interference, especially at the beginnings of iterative processing, we will apply the Minimum Mean Square Estimator (MMSE) filtering to minimize the squared error of the filtered output. It will be appreciated by those skilled in the art that a Matched Filter (MF) technique may also be appropriate, taking into account relative gains or losses in both effectiveness and processing efficiency.

Minimizing the mean square error with ideal output, the weight vector of MMSE filtering is defined by $$w_k = \text{argmin } E\{|w^H y_k - x_k|^2\} \quad \text{(Eq. 3)}$$

In this case, $w_k$ is given by S. Haykin, "Adaptive Filter Theory" (Prentice Hall, 1996)

$$w_k = R^{-1} p \quad \text{(Eq. 4)}$$

where, R and p corresponds to correlation matrix of received symbols vector and correlation vector between received symbols vector and desired output respectively. Then, R can be given as $$\begin{aligned} R &= E[y_k y_k^H] \quad &\text{(Eq. 5)} \\ &= E[\{H(x - \tilde{x}_k) + n\}\{H(x - \tilde{x}_k) + n\}^H] \\ &= E[H(x - \tilde{x}_k)(x - \tilde{x}_k)^H H^H + \\ &\quad H(x - \tilde{x}_k) n^H + n(x - \tilde{x}_k)^H H^H + nn^H] \\ &= HE[(x - \tilde{x}_k)(x - \tilde{x}_k)^H] H^H + E[nn^H]. \end{aligned}$$

Although $E[(x - \tilde{x}_k)(x - \tilde{x}_k)^H]$ matches the covariance matrix of x, because each element in $(x - \tilde{x}_k)$ is independent, the covariance matrix becomes diagonal. All elements except for k-th is computed by $$\begin{aligned} (V_k)_i &= E[(x_i - \tilde{x}_i)(x_i - \tilde{x}_i)^*] \quad &\text{(Eq. 6)} \\ &= E[|x_i|^2] - E[|\tilde{x}_i|^2] \\ &= 1 - |\tilde{x}_i|^2, \end{aligned}$$

while $(V_k)_i$ becomes 1 for i=k. The second term also becomes diagonal with its element of $\sigma^2$. Thus, (Eq. 5) becomes $$R = HV_k H^H + \sigma^2 I_{n_R} \quad \text{(Eq. 7)}$$

where $\sigma^2$ is the variance of Gaussian noise.

On the other hand, p is computed as $$\begin{aligned} P &= E[y_k x_k^*] \quad \text{(Eq. 8)} \\ &= E[\{H(x - \tilde{x}_k) + n\} x_k^*] \\ &= HE[(x - \tilde{x}_k) x_k^*] \\ &= h_k. \end{aligned}$$

Therefore, solving for Eq. 3, the weight vector based on MMSE criteria can be given by $$w_k = (HV_k H^H + \sigma^2 I_{n_R})^{-1} h_k \quad \text{(Eq. 9)}$$

Finally, the filter output from the k-th stream is $$z_k = w_k^H y_k \quad \text{(Eq. 10)}$$

The filter output $z_k$ would again be considered of the form $z_k = \mu_k x_k + v_k$, where $\mu_k$ and $v_k$ denotes the equivalent fading coefficient and the noise, respectively. From the above derivations, we have $$\mu_k = w_k^H h_k \quad \text{(Eq. 11)}$$

On the other hand, the variance of $v_k$, defined as $r_k^2$ here, is formed as $$\begin{aligned} r_k^2 &\equiv \text{Var}(v_k) \quad \text{(Eq. 12)} \\ &= E[v_k^2] - E[v_k]^2 \\ &= E[|z_k - \mu_k x_k|^2] \\ &= E[|z_k|^2] + E[|\mu_k x_k|^2] - E[z_k \mu_k^* x_k^*] - E[z_k^* \mu_k x_k]. \end{aligned}$$

Each term in (Eq. 12) is computed as follows $$\begin{aligned} E[|z_k|^2] &= E[(w_k^H y_k)(w_k^H y_k)^*] \quad \text{(Eq. 13)} \\ &= w_k^H E[y_k y_k^H] w_k \\ &= w_k^H (HV_k H^H + \sigma^2 I_{n_R}) w_k \\ &= w_k^H h_k \\ &= \mu_k \end{aligned}$$

$$E[|\mu_k x_k|^2] = \mu_k^2$$

$$\begin{aligned} E[z_k \mu_k^* x_k^*] &= \mu_k^* x_k^* E[z_k] \\ &= \mu_k^* x_k^* \mu_k x_k \\ &= \mu_k^2 \end{aligned}$$

$$\begin{aligned} E[z_k^* \mu_k x_k] &= E[z_k^*] \mu_k x_k \\ &= \mu_k^* x_k^* \mu_k x_k \\ &= \mu_k^2. \end{aligned}$$

Therefore, we obtain $$r_k^2 \equiv \text{Var}(v_k) = \mu_k - \mu_k^2 \quad \text{(Eq. 14)}$$

As shown in Eq. (9), the MMSE filtering involves the matrix inversion of an $n_R \times n_R$ matrix. Accordingly, it sometimes causes computational problems, especially in the case of large number of receive antennas. Therefore, we will also propose a matched-filtering scheme, where the weight $w_k$ is simply taken as the channel vector, i.e., $w_k = h_k$.

Then the corresponding equivalent fading coefficient and noise variance can be computed as $$\mu_k = h_k^H h_k \quad \text{(Eq. 15)}$$

$$\begin{aligned} r_k^2 &\equiv \text{Var}(v_k) \quad \text{(Eq. 16)} \\ &= E[|z_k - \mu_k x_k|^2] \\ &= E[|z_k|^2] - \mu_k^2 \\ &= w_k^H (HV_k H^H + \sigma^2 I_{n_R}) w_k - \mu_k^2 \\ &= h_k^H (HV_k H^H + \sigma^2 I_{n_R}) h_k - \mu_k^2 \\ &= h_k^H HV_k H^H h_k + \sigma^2 h_k^H h_k - \mu_k^2 \\ &= \sum_{j=1}^{n_T} (V_k)_j |h_k^H h_j|^2 + \sigma^2 \mu_k - \mu_k^2. \end{aligned}$$

The interference canceller according to the present invention is not limited to any one filtering method. For example, the method of computing the filter weights can be adaptively chosen for each iteration, according to one of several criteria, including a minimum SNR, SNIR, BER, FER, BLER, LLR. The filtering method may be chosen according to the number of iterations performed, with more effective yet complex methods chosen earlier in the process, or simpler methods may be applied earlier in the process, with more complex methods applied if it is determined that the complexity is necessary to achieve a suitable result. Alternately, the filtering method may be chosen based upon the number of transmit or receive antennae, on the consideration that the complexity increases exponentially with number of receive antennae.

Although a MF scheme can maximize the combined SNR, the corruption by interfering symbols would be dominant, especially in the, beginning of the iteration, since no interference is cancelled yet. MMSE filtering can be applied to maximize combined SNIR. However, MMSE filtering complexity will sometimes,become prohibitive, as highlighted above. Therefore, in a preferred embodiment, we apply the MMSE filtering only in the first processing, to sufficiently suppress interference from the other antennas. Subsequently, a MF scheme is applied to achieve reduced complexity. Although SIC-MF causes performance degradations, by applying MMSE filtering only in the first iteration, the hybrid scheme can achieve almost the same performance with MMSE-based I-SIC under frequency flat and selective conditions. Therefore, computational complexity will be reduced compared to the SIC-MMSE.

The LLR is defined as $$\Lambda(b_i) = \ln \frac{P(b_i = 0 | y_j)}{P(b_i = 1 | y_j)}, \quad \text{(Eq. 17)}$$

where $b_i$ is the i-th bit and $y_j$ is the received signal containing $b_i$, respectively. Assuming QPSK encoding, Eq. (17) can be written as $$\Lambda(b_{2l}) = \ln \frac{P(b_{2l} = 0 \mid z_l)}{P(b_{2l} = 1 \mid z_l)}, \quad \text{(Eq. 18)}$$

$$\Lambda(b_{2l+1}) = \ln \frac{P(b_{2l+1} = 0 \mid z_l)}{P(b_{2l+1} = 1 \mid z_l)}, \quad \text{(Eq. 19)}$$

where l corresponds the l-th received symbol after P/S conversion. Because $\Lambda(b_{2l})$ and $\Lambda(b_{2l+1})$ are computed in a similar manner, we will only concentrate on $\Lambda(b_{2l})$ in the following.

According to the Bayes' rule, Eq. (18) can be written as $$\Lambda(b_{2l}) = \ln \frac{P(z_l \mid b_{2l} = 0)}{P(z_l \mid b_{2l} = 1)} + \ln \frac{P(b_{2l} = 0)}{P(b_{2l} = 1)} \quad \text{(Eq. 20)}$$

The first term is the so-called extrinsic information calculated by the received symbol and the signal constellation and the second term is the a priori probability ratio given by the previous turbo decoder processing. At this time, only extrinsic information should be transferred to the subsequent turbo decoder.

Let $\lambda_1(b_{2l})$ be the extrinsic information of $b_{2l}$. Then we have $$\lambda_1(b_{2l}) = \ln \frac{P(z_{2l} \mid b_{2l} = 0, b_{2l+1} = 0)P(b_{2l+1} = 0) + P(z_{2l} \mid b_{2l} = 0, b_{2l+1} = 1)P(b_{2l+1} = 1)}{P(z_{2l} \mid b_{2l} = 1, b_{2l+1} = 0)P(b_{2l+1} = 0) + P(z_{2l} \mid b_{2l} = 1, b_{2l+1} = 1)P(b_{2l+1} = 1)} \quad \text{(Eq. 21)}$$

$$= \ln \frac{P(z_{2l} \mid C_0)P(b_{2l+1} = 0) + P(z_{2l} \mid C_1)P(b_{2l+1} = 1)}{P(z_{2l} \mid C_2)P(b_{2l+1} = 0) + P(z_{2l} \mid C_3)P(b_{2l+1} = 1)}$$

$$= \ln \frac{P(z_{2l} \mid C_0)P(b_{2l+1} = 0)/P(b_{2l+1} = 1) + P(z_{2l} \mid C_1)}{P(z_{2l} \mid C_2)P(b_{2l+1} = 0)/P(b_{2l+1} = 1) + P(z_{2l} \mid C_3)}$$

Based on QPSK encoded, Gray mapped signal constellations, $P(z_{2l} \mid C_i)$ can be computed as $$P(z_{2l} \mid C_i) = \frac{1}{\pi v_{2l}^2} \exp\left(-\frac{1}{v_{2l}^2} |z_{2l} - \mu_{2l} C_i|^2\right) \quad \text{(Eq. 22)}$$

On the other hand, extrinsic information from channel decoder, corresponds to the a priori probability and given by $$\ln \frac{P(b_i = 0)}{P(b_i = 1)} = \lambda_2(b_i). \quad \text{(Eq. 23)}$$

Then, likelihood can be denoted as $$\frac{P(b_i = 0)}{P(b_i = 1)} = \exp[\lambda_2(b_i)] \quad \text{(Eq. 24)}$$

Therefore, by introducing approximation of $\ln(e^x + e^y) \approx \max(x, y)$, Eq. (21) becomes $$\lambda_1(b_{2l}) = \ln \frac{\frac{1}{\pi v_{2l}^2}\exp\left(-\frac{1}{v_{2l}^2}|z_{2l} - \mu_{2l}C_0|^2\right) \cdot \exp[\lambda_2(b_{2l+1})] + \frac{1}{\pi v_{2l}^2}\exp\left(-\frac{1}{v_{2l}^2}|z_{2l} - \mu_{2l}C_1|^2\right)}{\frac{1}{\pi v_{2l}^2}\exp\left(-\frac{1}{v_{2l}^2}|z_{2l} - \mu_{2l}C_2|^2\right) \cdot \exp[\lambda_2(b_{2l+1})] + \frac{1}{\pi v_{2l}^2}\exp\left(-\frac{1}{v_{2l}^2}|z_{2l} - \mu_{2l}C_3|^2\right)} \quad \text{(Eq. 25)}$$

$$= \max\left\{-\frac{1}{v_{2l}^2}|z_{2l} - \mu_{2l}C_0|^2 + \lambda_2(b_{2l+1}), -\frac{1}{v_{2l}^2}|z_{2l} - \mu_{2l}C_1|^2\right\} -$$

$$\max\left\{-\frac{1}{v_{2l}^2}|z_{2l} - \mu_{2l}C_2|^2 + \lambda_2(b_{2l+1}), -\frac{1}{v_{2l}^2}|z_{2l} - \mu_{2l}C_3|^2\right\}$$

$$= \max\left\{2\operatorname{Re}\left[\frac{z_{2l}^* \mu_{2l} C_0}{v_{2l}^2}\right] + \lambda_2(b_{2l+1}), 2\operatorname{Re}\left[\frac{z_{2l}^* \mu_{2l} C_1}{v_{2l}^2}\right]\right\} -$$

$$\max\left\{2\operatorname{Re}\left[\frac{z_{2l}^* \mu_{2l} C_2}{v_{2l}^2}\right] + \lambda_2(b_{2l+1}), 2\operatorname{Re}\left[\frac{z_{2l}^* \mu_{2l} C_3}{v_{2l}^2}\right]\right\}$$

where $|C_l|^2=1$ is used for the final equality.

Similarly, we can calculate $\lambda_1(b_{2l+1})$, which is a function of $z_{2l}$ and $\lambda_2(b_{2l})$. The extrinsic information computed for all code bits including tail sequence is then fed to Turbo decoder and Turbo decoder calculates again LLR and the extrinsic information of all code bits based on the its trellis diagram and the extrinsic information derived above.

By using LLR produced by Turbo decoder, soft estimate generator 40 creates soft replica symbols. This function weighs all the candidate of symbol constellation and combines as $$\tilde{x}_l = C_0 P_{2l}{}^0 P_{2l+1}{}^0 + C_1 P_{2l}{}^0 P_{2l+1}{}^1 + C_2 P_{2l}{}^1 P_{2l+1}{}^0 + C_3 P_{2l}{}^1 P_{2l+1}{}^1 \quad \text{(Eq. 26)}$$

where $P_l{}^0$ and $P_l{}^1$ are a posteriori probability of 0 and 1 for l-th code bit and these are computed as $$P_l^0 = \text{Prob.}(b_l = 0) = \frac{\exp[\Lambda(b_l)]}{1 + \exp[\Lambda(b_l)]}, \quad \text{(Eq. 27)}$$

$$P_l^1 = \text{Prob.}(b_l = 1) = \frac{\exp[-\Lambda(b_l)]}{1 + \exp[-\Lambda(b_l)]}. \quad \text{(Eq. 28)}$$

This soft estimate is utilized by SIC 38 in a subsequent iteration.

Considering realistic operation of MIMO systems, one first must estimate a channel coefficient at the receiver. One method known in the art is the utilization of pilot symbols. In the case that $N_p$ pilot symbols are employed from each transmit antenna, received symbols sequence becomes $$y(t)=Hs(t)+v(t), \ 1 \leq t \leq N_p \quad \text{(Eq. 29)}$$

By placing $N_p$ column vectors in a matrix, we can obtain $$Y=HS+V \quad \text{(Eq. 30)}$$

where $Y=(y(1),y(2), \ldots y(N_p))$, $S=(s(1),s(2), \ldots s(N_p))$, $V=(v(1),v(2), \ldots ,v(N_p))$. The technique presumes that $N_p$ is larger than $n_T$. It is reasonable to assume the power of pilot symbols as 1 so $$\sum_{i=1}^{n_T} \sum_{j=1}^{N_p} |s_{ij}|^2 = N_p n_T. \quad \text{(Eq. 31)}$$

Multiplying a pseudo inverse matrix of s to Y from the right side, channel estimate would be given as $$\hat{H}=YS^+ \quad \text{(Eq. 32)}$$

Since $N_p$ is larger than $n_T$, the pseudo inverse matrix of s becomes $S^H(SS^H)^{-1}$. Thus, (Eq. 32) can be re-arranged as $$\begin{aligned}\hat{H} &= YS^H(SS^H)^{-1} \quad \text{(Eq. 33)} \\ &= (HS+V)S^H(SS^H)^{-1} \\ &= H + VS^H(SS^H)^{-1} \\ &= H + H^\varepsilon.\end{aligned}$$

To minimize estimation error, S should be chosen such that total variance of $H^\varepsilon$ can be as small as possible. It is shown in Marzetta, "BLAST Training: Estimating Channel Characteristics For High-Capacity Space-Time Wireless", Proc. 37th Annual Allerton Conference on Communications, Computing and Control, Monticello, Ill. (September 1999), that the optimal training sequence should satisfy $$SS^H = N_p I_{n_T} \quad \text{(Eq. 34)}$$

FIGS. 4 and 5 show the simulated FER performances of MF, MMSE and Hybrid schemes with 4-iterations under flat and exponentially distributed 12-path conditions. Ideal GI deletion and channel estimation are assumed here. From FIG. 4, performances of the SIC-Hybrid scheme is exactly the same with that of SIC-MMSE under both frequency flat and selective conditions, while that of 4 antennas is slightly degraded as shown in FIG. 5. The outage capacity, which can be considered as frame error rate, of (2×2) and (4×4) is respectively 6 dB at 4% and 3 dB at 7% under flat fading condition. Therefore, we can conclude that the SIC-Hybrid and SIC-MMSE can approach to 2.8 and 2.5 dB, respectively, in (2×2) and (4×4) systems. Since we only employed OFDM modulations, even in the case of frequency selective conditions, we can achieve good performances as shown.

To implement the present invention, any number of apparatus will be readily apparent to those skilled in the art in light of the instant disclosure. For example, the interference cancellation may be implemented by hardware means, including dedicated circuitry or ASICs, either modular or integral. Alternately the invention may be implemented through software, suitably interfaced with wireless transmission and/or receiving equipment. Some combination of software and hardware implementation may prove optimal from either a performance or manufacturing viewpoint, without departing from the scope of the invention. A receiver including the soft interference canceller according to the present invention may include a wireless telephone handset, an internet-capable device, or any other wireless communication equipment.

The present invention has been described herein with respect, to certain preferred embodiments. These embodiments are means to be illustrative, not limiting, of the scope of the invention. Modifications or alterations may be apparent to those skilled in the art without departing from the scope of the invention, which is defined by the appended claims.

What is claimed is:

1. An apparatus for canceling interference among multiple signals simultaneously transmitted from multiple transmitting antennae and received by multiple receiving antennae, the apparatus comprising a plurality of interference cancellers, at least one interference canceller corresponding to each transmitted signal, each interference canceller receiving a signal from each receiving antenna, and each interference canceller iteratively outputting an interference-cancelled received version of its corresponding transmitted signal, each interference canceller comprises a filter weight calculator adapted for selectively choosing for each iteration a calculation method, and for calculating the filter weight for each iteration using the selected method, wherein the calculation method from a choice of at least two methods, the method being selected based upon a number of transmitting and receiving antennae.

2. The apparatus for canceling interference according to claim 1 further comprising a soft symbol estimator for preparing an estimate of the received symbols from all transmitting antennae for use in each interference canceller.

3. The apparatus for canceling interference according to claim 2, wherein each interference canceller iteratively cancels interference against its corresponding transmitting signal until an interrupt criteria is met.

4. The apparatus for canceling interference according to claim 2, wherein each estimate includes a zero term for the transmitted signal corresponding to each interference canceller.

5. A multi-input multi-output wireless communication receiver comprising the interference canceling apparatus according to claim 1.

6. The wireless communication receiver according to claim 5, further comprising a parallel-to-serial converter for converting the plural interference canceller outputs into a serial stream.

7. The wireless communication receiver according to claim 5, further comprising a decoder for recovering a data stream based upon the plural interference canceller outputs.

8. A method of canceling interference among multiple signals simultaneously transmitted from multiple transmitting antennae and received by multiple receiving antennae, the method comprising:
(a) providing a received signal from each receiving antenna to each of a plurality of interference cancellers, at least one interference canceller corresponding to each said transmitted signal, each interference canceller canceling interference against its corresponding transmitted signal;
(b) canceling interference by comparison of the received signals with an estimate of the transmitted signal and cancellation of all but the corresponding transmitted signal in each interference canceller;
(c) multiplying each estimate by a channel coefficient matrix;
(d) subtracting the products of each estimate and the channel coefficient matrix from the received signals, resulting in a corresponding difference between each of the products and each of the received signals; and
(e) multiplying the corresponding difference between each of the products and each of the received signals by a filter weight vector, a calculation method for calculating the filter weight vector is selectively chosen from at least two methods, the method being selected based upon at a SNR and a log likelihood ratio.

9. The method according to claim 8, wherein each estimate prepared in step (b) includes a zero term for the transmitted signal corresponding to each interference canceller.

10. The method of canceling interference according to claim 8, wherein the channel coefficient matrix is derived from the receipt of a known pilot signal.

11. The method of canceling interference according to claim 8, further comprising iteratively performing steps (b)-(e) until a predetermined interrupt criteria is met, and said method of calculating the filter weight vector is selected for each iteration.

12. A method of conducting multi-input multi-output wireless communications comprising executing the interference canceling method of claim 8 on a receiving end.

13. A method of canceling interference among multiple signals simultaneously transmitted from multiple transmitting antennae and received by multiple receiving antennae, the method comprising:
(a) providing a received signal from each receiving antenna to each of a plurality of interference cancellers, at least one interference canceller corresponding to each said transmitted signal, and each interference canceller dedicated to canceling interference against its corresponding transmitted signal;
(b) preparing an estimate of the transmitted signals from all transmitting antennae for use in each interference canceller,
(c) multiplying each estimate by a channel coefficient matrix;
(d) subtracting the resulting products of each estimate and the channel coefficient matrix from the received signals, resulting in a corresponding difference between each of the products and each of the received signals;
(e) multiplying each corresponding difference by a filter weight vector, a calculation method for calculating the filter weight vector is selectively chosen from at least two methods, the method of calculating the filter weight vector is a minimum mean square error (MMSE) method in a first iteration, and a matched filter (MF) method in any subsequent iterations;
(f) decoding the received signal based upon the resulting products of said difference and said filter weight vector;
(g) if a predetermined interrupt criteria is not met, then using said decoded signal in the preparation of an estimate for a subsequent interference cancellation iteration; and
(h) iteratively performing steps (b)-(g) if the predetermined interrupt criteria is not met.

14. The method according to claim 13, wherein each estimate prepared in step (b) includes a zero term for the transmitted signal corresponding to each interference canceller.

15. The interference canceling method of claim 13 wherein the method of calculating the filter weight vector used for the first iteration is different from the method used for successive iterations.

16. The interference canceling method of claim 13 wherein the selection criteria for the method of calculating the filter weight vector used in step (e) is at least one of a SNR, a SNIR, the number of receive or transmit antennae, a log likelihood ratio, the number of iterations, and a constellation of the estimate of the transmitted signals.

17. The interference canceling method of claim 13 wherein the interrupt criteria is at least one of the number of erroneous bits, the number of erroneous blocks, the number of erroneous frames, a log likelihood ratio and the number of iterations.

18. The interference canceling method of claim 13 wherein the channel coefficient matrix is derived from the receipt of a known pilot signal.

19. A method of conducting multi-input multi-output wireless communications comprising executing the interference canceling method of claim 13 on a receiving end.

20. An apparatus for canceling interference among multiple signals simultaneously transmitted from multiple transmitting antennae and received by multiple receiving antennae, the apparatus comprising:
a plurality of interference cancellers, at least one interference canceller corresponding to each said transmitted signal, and each interference canceller dedicated to cancel interference against its respective transmitted signal;
soft symbol estimator means for preparing an estimate of the transmitted symbols for use in each interference canceller, each estimate including a zero term for the transmitted signal corresponding to each interference canceller;
means for multiplying each estimate by a channel coefficient matrix;

means for subtracting the resulting products of each estimate and the channel coefficient matrix from the received signal;

means for selecting a calculation method for calculating a filter weight vector from at least two different methods, the method being selected from one of a minimum mean square error (MMSE) method and a matched filter (MF) method, and for calculating the filter weight vector using the selected method;

means for multiplying the each difference between said product and the received signal by a filter weight vector; and means for decoding the signal based upon the resulting products of said difference and said filter weight vector.

21. The apparatus for canceling interference according to claim 20, wherein said soft symbol estimator uses the decoded signal from a previous iteration for preparing the estimate of the transmitted symbols.

22. The apparatus for canceling interference according to claim 20, wherein said soft symbol estimator uses the interference cancelled signal for preparing the estimate of the transmitted symbols.

23. A multi-input multi-output wireless communication system comprising a receiver having the interference canceling apparatus according to claim 20.

* * * * *